United States Patent [19]

Kohl

[11] 3,840,109
[45] Oct. 8, 1974

[54] LOW PRESSURE LIVE ROLL CONVEYOR
[75] Inventor: Robert E. Kohl, Manlius, N.Y.
[73] Assignee: Diebold Incorporated, Canton, Ohio
[22] Filed: Feb. 24, 1972
[21] Appl. No.: 229,039

[52] U.S. Cl. .............................. 198/127, 198/208
[51] Int. Cl. ............................................. B65g 13/02
[58] Field of Search .......... 198/127, 208, 127, 208, 198/230; 193/35 R, 35 B; 242/75.3

[56] References Cited
UNITED STATES PATENTS

| 3,247,950 | 4/1966 | Roth | 198/127 |
|---|---|---|---|
| 3,625,446 | 12/1971 | Floyd | 242/75.3 |
| 3,414,115 | 12/1968 | Gates et al. | 198/208 |
| 668,378 | 2/1901 | Korth et al. | 198/208 |
| 2,781,892 | 2/1957 | Thevenieau | 198/208 |

Primary Examiner—Richard E. Aegerter
Assistant Examiner—Joseph E. Valenza
Attorney, Agent, or Firm—Frease and Bishop

[57] ABSTRACT

A power driven material handling conveyor having an improved, readily adjustable pressure roll assembly mounted thereon. A plurality of conveyor rolls are rotatably mounted in a pair of spaced frames and are driven by a belt mounted beneath and in contact with the rolls. A pressure roll is rotatably mounted on one end of a bracket and the other end of the bracket forms a counterweight. A fulcrum bar extends through slots in the bracket intermediate the pressure roll and counterweight, and is parallel to the axis of the pressure roll. The bar is mounted in the conveyor frame beneath the driven belt, and the counterweight biases the frame to pivot about the bar so that the pressure roll engages the drive belt under pressure. The bracket slots are formed with an upper notched edge selectively engaged with the bar whereby the bracket and attached roll and counterweight may be adjusted with respect to the fulcrum bar, so that the pressure roll exerts the desired force on the belt, which may be varied according to the load being carried by the conveyor.

3 Claims, 6 Drawing Figures

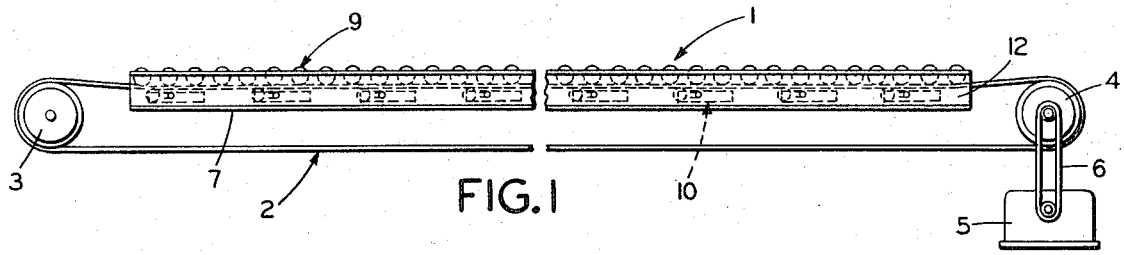
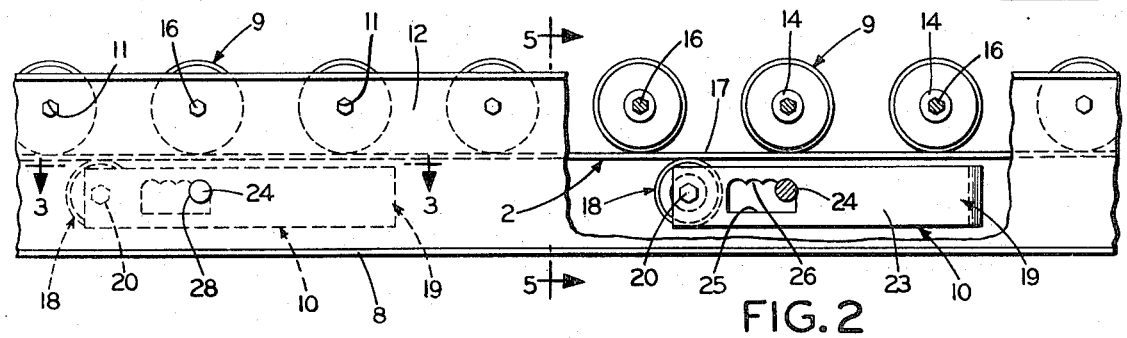
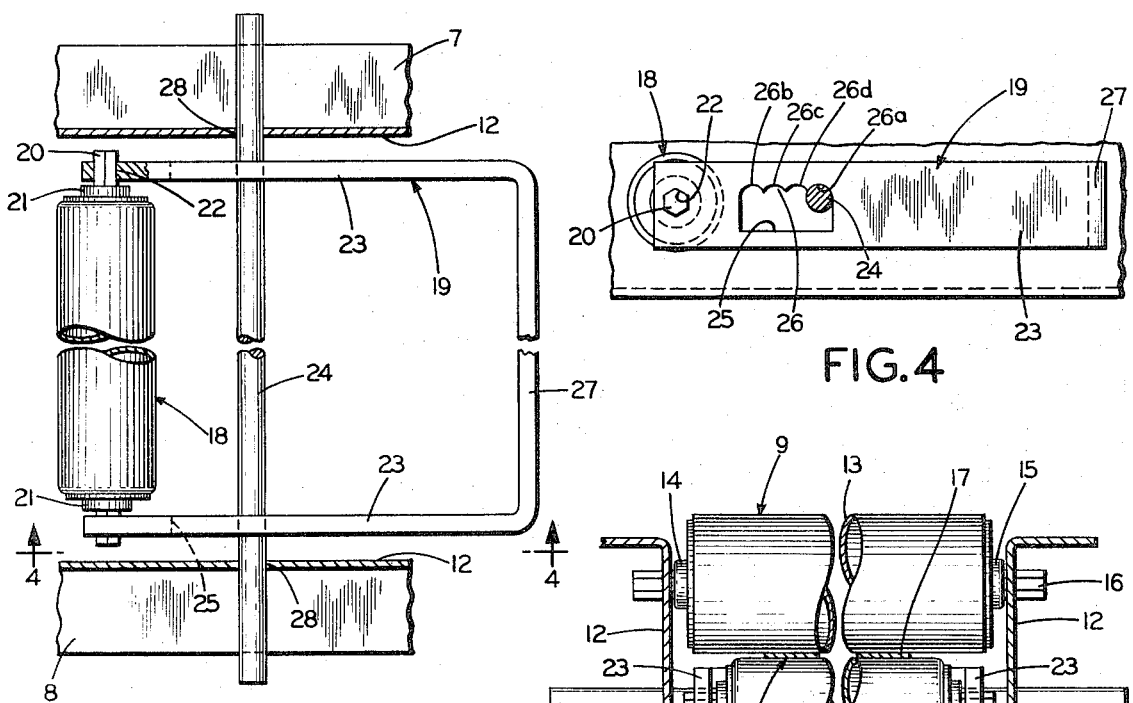
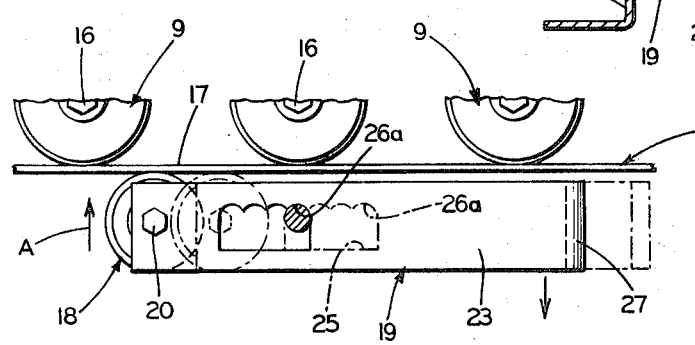

LOW PRESSURE LIVE ROLL CONVEYOR

BACKGROUND OF THE INVENTION

1. Field of the Invention

The invention relates to live roll conveyors and in particular to low pressure live roll conveyors. More particularly, the invention relates to a conveyor having a plurality of pressure roll assemblies which are counterweighted to provide a snubbing action on the conveyor driving belt to provide a uniform low pressure driving force regardless of changes in belt tension due to conveyor loads. The counterweight effect of the pressure rolls may be adjusted quickly and conveniently to provide for anticipated large changes in conveyor loading.

2. Description of the Prior Art

Live roll or power driven conveyors have had a plurality of rolls mounted in frames and forming a path of travel for materials to be moved thereon. Various types of driving means are used to rotate the rolls, such as belts, chains, pulleys, gears and the like.

The belt-driven live roll conveyors have proven very satisfactory and inexpensive to construct and operate. Problems, however, have arisen in the construction and operation of such belt-driven live roll conveyors, as described in U.S. Pat. No. 3,247,950, relating to fluctuating conveyor loads due to backups on the conveyor, changes in the type of material being conveyed, irregular spacing between the material, and the like.

The friction and pressure between the drive belt and conveyor rolls change as the pressure on the rolls change due to change in the weight of the material being moved by the conveyor. It is desired to maintain this pressure at a low level, sufficient to move the material along the conveyor at the desired speed. Excess pressure causes undue wear on the drive belt, drive motor, conveyor rolls and various other conveyor components.

Prior conveyor constructions attempt to maintain this pressure at a low level by providing compensating means on the conveyor which automatically adjusts to maintain the desired pressure as the conveyor load changes. Other conveyors provide means for manually adjusting the conveyor to compensate for load changes as well as providing for automatic adjustment.

One prior art load compensator construction uses a separate counterweight attached to a hinge assembly which requires the use of tools to loosen nuts, etc. to permit adjustments of the counterweight. This load compensator does not permit adjustment of the position of the idler or pressure roll along the conveyor belt.

No belt-driven live roll conveyor construction of which I am aware has provided adjustment for a counterweighted pressure roll assembly for maintaining the drive belt pressure at a low level, by readily adjustable means formed in the pressure roll assembly mounting on the conveyor frame.

SUMMARY OF THE INVENTION

Objectives of the invention include providing a low pressure live roll conveyor which compensates for tension changes in the conveyor drive belt resulting from fluctuating conveyor loads; providing a low pressure live roll conveyor in which a plurality of pressure roll assemblies are pivotally suspended beneath the conveyor frame and are formed with slots cooperating with the pivot suspension enabling the assemblies to be adjusted manually, easily and conveniently without the use of tools or other equipment; providing a low pressure live roll conveyor in which each pressure roll assembly is adjustable along a section of the conveyor drive belt and in which the counterweight is formed as an integral part of the pressure roll assembly bracket eliminating separate components attached to and extending outwardly from the bracket which may interfere with other equipment and present a safety hazard; and providing a low pressure live roll conveyor which is of an extremely simple and inexpensive design and construction; which eliminates difficulties heretofore encountered, achieves the stated objectives simply and effectively, and solves problems and satisfies existing needs.

These objectives and advantages are obtained by the low pressure live roll conveyor, the general nature of which may be stated as including frame means having spaced parallel mounting rails; a plurality of conveyor rolls rotatably suported on and extending between the rails; belt means extending longitudinally between the mounting rails and engaging the rolls; drive means connected to the belt means for moving the belt means to drive the rolls; a plurality of belt pressure regulating roll means, each including a bracket having first and second ends, a pressure roll rotatably mounted on the bracket first end, and counterweight means mounted on the bracket second end; slot means formed in the bracket between the first and second ends; fulcrum bar means carried by the rails and extending through the bracket slot means pivotally mounting the bracket on the mounting rails, whereby the counterweight means moves downwardly about the fulcrum bar to bias the pressure roll upwardly into engagement with the belt means; and notch means formed in the slot means selectively engaging the bar for adjustably positioning the bracket on the bar whereby the force exerted on the belt means by the pressure roll means may be varied.

BRIEF DESCRIPTION OF THE DRAWING

A preferred embodiment of the invention - illustrative of the best mode in which applicant has contemplated applying the principles — is set forth in the following description and shown in the drawing and is particularly and distinctly pointed out and set forth in the appended claims.

FIG. 1 is a diagrammatic side elevation of the improved adjustable low pressure live roll conveyor;

FIG. 2 is an enlarged fragmentary elevational view of a portion of FIG. 1, with portions broken away and in section, showing two of the pressure roll assemblies;

FIG. 3 is an enlarged fragmentary sectional view taken on line 3—3, FIG. 2;

FIG. 4 is a sectional view taken on line 4—4, FIG. 3;

FIG. 5 is an enlarged sectional view taken on line 5—5, FIG. 2; and

FIG. 6 is a diagrammatic side elevation showing the pressure roll assembly in two adjusted positions.

Similar numerals refer to similar parts throughout the drawings.

DESCRIPTION OF THE PREFERRED EMBODIMENT

The improved adjustable low pressure live roll conveyor is generally indicated at 1 (FIG. 1). Conveyor 1 includes an endless conveyor belt 2 which is mounted on drive drums 3 and 4 located at the ends of conveyor 1. Drum 4 is connected to a source of power, such as motor 5, by pulley belt 6.

Conveyor 1 includes a pair of spaced frame members 7 and 8, a plurality of spaced rolls 9, and a pressure roll assembly 10.

Frame members 7 and 8 preferably are channel-shaped and have a row of holes 11 formed in the upper ends of each vertical channel web 12. Holes 11 are formed with at least one flat side and preferably are hexagonally shaped.

Rolls 9 are usual cylindrical conveyor rolls having an outer, hollow tube 13 with bearings 14 and 15 journaled in the open ends thereof. A shaft 16 extends throughout the length of tube 13 and through bearings 14 and 15. Shaft 16 is hexagonal in cross section and is nonrotatably mounted in channel holes 11.

Rolls 9 also may be of the type in which the outer tube is fixed to a central shaft, and the shaft is journaled in bearing mounted in the channel webs.

In accordance with the invention, a plurality of pressure roll assemblies 10 are mounted on channels 7 and 8, extending beneath rolls 9 and the upper or roll contacting portion 17 of belt 2. Each assembly 10 includes a floating or pressure roll 18 rotatably mounted on the open end of a U-shaped bracket 19. Roll 18 may be similar to rolls 9 having a central shaft 20, hexagonal in shape, and journaled in bearings 21. Shaft 20 is mounted in hexagonally-shaped holes 22 formed in the unconnected ends of legs 23 of bracket 19.

A fulcrum bar 24 extends through a pair of aligned slots 25 formed in legs 23 of bracket 19 and is parallel to the axis of pressure roll 18. A plurality of notches 26 are formed in legs 23 at the upper edge of slots 25. Notches 26 are semicircular in shape, equal in diameter to the diameter of bar 24.

A counterweight member 27 forms the closed end of bracket 19 and extends between the ends of legs 23 opposite roll 18. Slots 25 preferably are located closer to roll 18 than to member 27 so that the weight of member 27, plus the weight of portion of legs 23 between member 27 and bar 24, is greater than the weight of roll 18 plus the weight of the remaining portion of legs 23.

Bar 24 extends through a pair of holes 28 formed in channels 7 and 8, which holes are spaced below and preferably are aligned with one pair of holes 11 (FIG. 2). Bar 24, thus serves as the fulcrum for and pivotally mounts pressure roll assembly 10 beneath rolls 9 and drive belt portion 17. Counterweight member 27 biases roll 18 upwardly (Arrow A, FIG. 6) into contact with belt portion 17 which in turn bears against rolls 9.

Pressure roll assemblies 10 are adjusted manually, easily and conveniently by grasping roll 18 and counterweight 27 and moving assembly 10 longitudinally along channel members 7 and 8 until bar 24 is engaged in selected pairs of notches 26.

Pressure roll assemblies 10 automatically compensate for conveyor load changes by the pressure exerted on belt portion 17 by rolls 18. The frictional loading of belt 2 will vary as the loading of conveyor rolls 9 varies due to the weight and amount of material being conveyed, thereby varying the tension and tautness in belt 2. These loading changes will be compensated for by assemblies 10, through the upward movement and force of rolls 18 on belt 2, by the downward movement of counterweights 27.

Rolls 18, once positioned with respect to counterweight 27 and fulcrum bar 24, provide compensations for wide changes in tension of belt 2.

Problems arise where the conveyor load changes considerably requiring greater driving force to convey materials. Assemblies 10 may be adjusted manually to compensate for large amounts of anticipated conveyor load changes, and still retain their ability to automatically adjust for changes in belt tension during movement of material along the conveyor. Such manual and automatic adjustments enable a low pressure to be maintained between the conveyor drive belt and the driven rolls for a wide range of conveyor loading.

Where light conveyor loads are anticipated, bracket 19 is moved to the position as shown in FIG. 4, and in full lines, FIG. 6, so that bar 24 is engaged in the notch 26 furthest from roll 18, indicated as notch 26a. Roll 18 exerts reduced pressure on belt 2 in this position, since the length of the movement arm between bar 24 and counterweight 27 is reduced and correspondingly the length of the movement arm between bar 24 and roll 18 is increased.

Where heavy conveyor loads are anticipated, brackets 19 are adjusted to increase the length of the movement arm between bars 24 and counterweights 27 which correspondingly reduces the length of the movement arm between bars 24 and rolls 18, as shown in dot-dash line FIG. 6, by placement of bars 24 in notches 26b. Rolls 18, thus exert increased pressure on belt 2 to compensate for the increased frictional loading of belt 2 by the increased loading on conveyor rolls 9.

Notches 26c and 26d (FIG. 4), provide intermediate points of adjustment for assemblies 10 when the anticipated conveyor loads are in the load range usually carried by the conveyor, and in the load range for which the conveyor was designed and built to carry.

Conveyor 1, thus enables adjustments to be made easily and conveniently for anticipated changes in conveyor loads by manual movement of assemblies 10 to provide low pressure conveyor operation. No tools or special equipment are required for adjusting conveyor 1 and only a few seconds is required for adjustment of each pressure roll assembly. This reduced time is important when a number of such pressure roll assemblies 10 are used on each section of conveyor, and a considerable number of sections are used in the conveyor system.

The improved adjustment means for the pressure roll assemblies enables the counterweight 27 to be formed as an integral portion of the assembly bracket, reducing the cost thereof. Prior load compensating assemblies involve a separate counterweight member mounted on a bracket in order to permit adjustments, since the load compensating bracket is fixed with respect to the conveyor frame.

The improved low pressure live roll conveyor is very simple in construction and provides an effective and sturdy conveyor, which enables the conveyor rolls and belt pressure to be at a low level, thereby increasing the efficiency and wear life of the conveyor belt, rolls, drive means and other components; provides a conveyor which can be readily adjusted manually for anticipated changes in conveyor loads and which adjusts automatically for minor load changes during movement of material along the conveyor; and provides a conveyor that is inexpensive and which eliminates difficulties encountered with prior conveyors, achieves the objectives indicated, and solves existing problems in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved low pressure live roll conveyor is constructed, assembled and operated, the characteristics of the new construction, and the advantageous, new and useful results obtained; the new and useful structures, devices, elements, arrangements, parts and combinations, and mechanical equivalents obvious to those skilled in the art are set forth in the appended claims.

I claim:

1. Live roll conveyor construction including frame means having spaced parallel mounting rails; a plurality of conveyor rolls rotatably supported on and extending between said rails; belt means extending longitudinally between said mounting rails and engaging said rolls; drive means connected to the belt means for moving said belt means to drive the rolls; a plurality of pressure regulating roll means, each including a bracket having first and second ends, a pressure roll rotatably mounted on said bracket first end, and counterweight means mounted on said bracket second end; longitudinally extending slot means having an upper edge formed in the bracket between said first and second ends; fulcrum bar means parallel to the axis of the pressure roll means and carried by the rails and extending through said bracket slot means pivotally mounting said bracket on said mounting rails, whereby the counterweight means moves downwardly about the fulcrum bar means to bias said pressure roll means upwardly into engagement with the belt means; and a plurality of notch means formed in the slot means upper edge selectively engaging the fulcrum bar means for adjustably positioning the bracket on the fulcrum bar means whereby the force exerted on the belt means by the pressure roll means may be varied.

2. The conveyor construction defined in claim 1 in which the bracket means includes a U-shaped member having spaced legs and a cross member; in which the slot means are formed in and extend longitudinally along said legs; and in which the cross member forms the counterweight means.

3. The conveyor construction defined in claim 2 in which the pressure roll means extends between the ends of the spaced legs opposite the counterweight means.

* * * * *